UNITED STATES PATENT OFFICE.

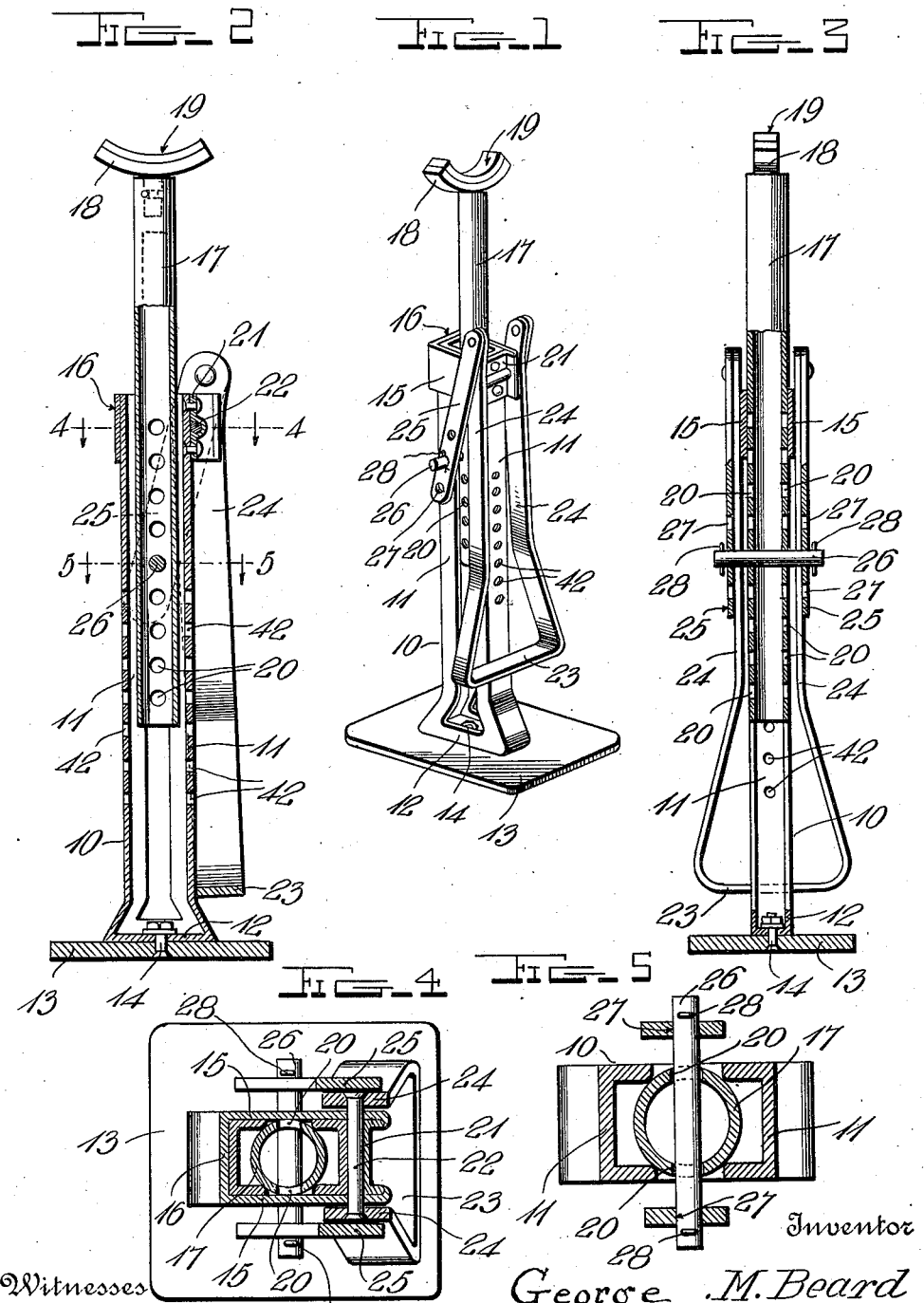

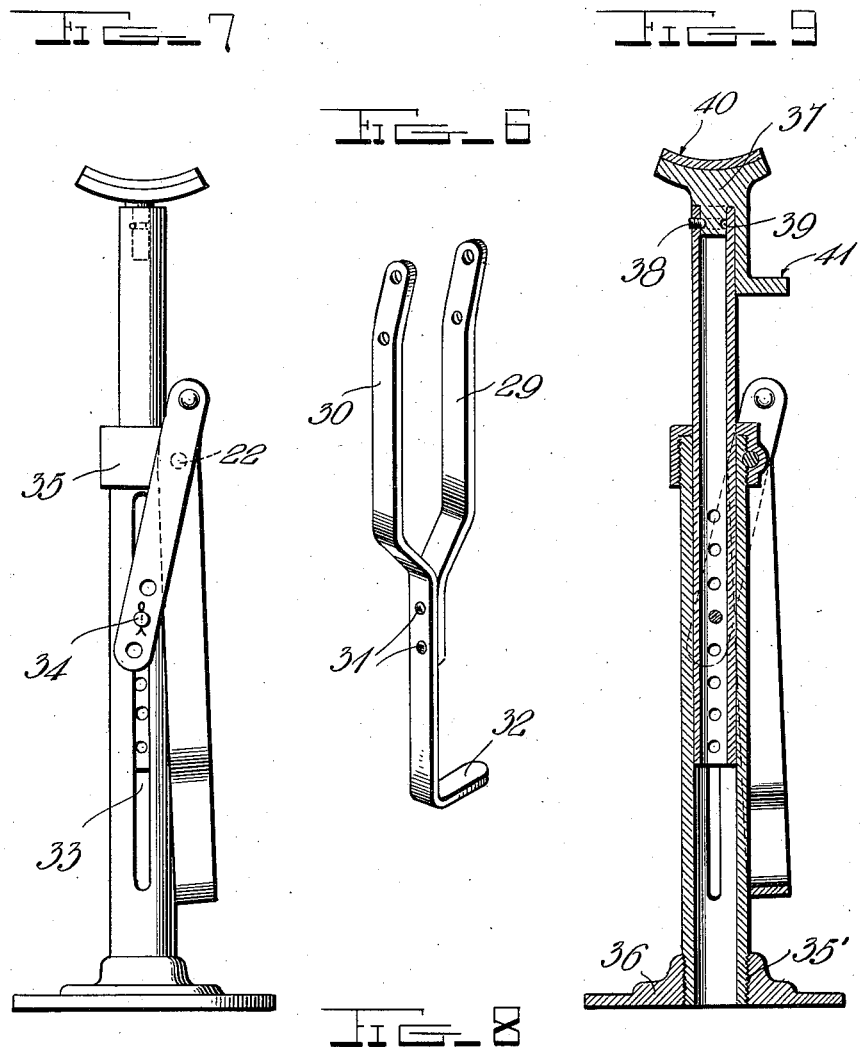

GEORGE M. BEARD, OF LAGRANGE, INDIANA.

VEHICLE-JACK.

1,014,801.  Specification of Letters Patent.  Patented Jan. 16, 1912.

Application filed January 10, 1911. Serial No. 601,818.

*To all whom it may concern:*

Be it known that I, GEORGE M. BEARD, a citizen of the United States, residing at Lagrange, in the county of Lagrange and State of Indiana, have invented certain new and useful Improvements in Vehicle-Jacks, of which the following is a specification.

It is the object of the present invention to provide an improved lifting jack designed particularly for use in connection with automobiles and similar vehicles.

One aim of the present invention is to provide a jack so constructed that it may be applied to various portions of the axles or wheels of a vehicle so that its successful operation will not depend upon the amount of space provided for its operation.

At this point it may be stated that the jack embodying the present invention is intended, for all purposes where a jack of any kind is used to support an automobile or similar vehicle with its tires spaced from the ground or other support upon which they would otherwise rest, it being so designed that it may be placed between the vehicle and a wall to which the vehicle is closely positioned.

A further aim of the present invention is to provide a jack so constructed that the weight imposed upon it will be supported directly above the vertical axis of the jack, and the operation of the jack to lift the vehicle will not tend to tilt the jack. In this connection, it may be stated that it is a well known fact that when an automobile or similar vehicle is allowed to stand in one position for a considerable length of time, its tires, if they are of rubber, soon become unfit for use. For this reason, whereas it has heretofore been customary to support the vehicle upon boxes or other supports which could not be readily removed, the present invention contemplates the provision of a jack, a set of which may be quickly applied to support the vehicle with its tires spaced from the floor and which may be readily and quickly manipulated to lower the vehicle to running position.

In the accompanying drawings, Figure 1 is a perspective view of the preferred form of the invention, Fig. 2 is a vertical transverse section therethrough, Fig. 3 is a similar view taken in a vertical plane at right angles to the plane of Fig. 2, Fig. 4 is a horizontal sectional view through the device on the line 4—4 of Fig. 2, Fig. 5 is a similar view on the line 5—5 of Fig. 2, Fig. 6 is a detail perspective view illustrating a slight modification of the lever of the jack, Fig. 7 is a side elevation showing a slight modification in the form of standard shown in Fig. 1, Fig. 8 is a horizontal sectional view through this modified form of standard, Fig. 9 is a vertical sectional view illustrating a further modification of the invention.

In the first five figures of the drawings, the numeral 10 indicates in general the fixed section of the standard of the jack and this section is preferably formed from a suitable length of channel iron bent to form the spaced portions 11 and the connecting or base portion 12. It will be observed that the channel iron is so bent that its side flanges are presented inwardly or toward each other. This section of the standard of the jack is supported upon a suitable base 13 to which it is secured by means of a bolt 14. The upper ends of the spaced portions of this standard section are connected by means of a clip consisting of a plate bent to form spaced portions 15 and a connecting portion 16, the clip being disposed with its spaced portions straddling the said upper ends of the spaced portions of the standard section, and secured thereto by any suitable means.

Mounted to slide vertically between the spaced portions of the fixed standard section of the jack is a tubular member 17 constituting the body of the movable section of the jack standard. At the upper end of the member 17 there is swiveled a head 18 which is shaped to engage with either the hub or axle of the vehicle in connection with which the jack is to be used. This head 18 is preferably faced with leather as at 19 to prevent marring of the finish of the hub or axle. By referring to Figs. 4 and 5 of the drawings it will be observed that the opposing edges of the flanges of the spaced portions of the fixed section of the standard are spaced and that the tubular member 17 is formed with a plurality of openings 20. These openings are arranged in diametrically oppositely located series, each series extending vertically between the edges of corresponding flanges of the spaced portions of the fixed standard section.

Secured to the upper end of one of the spaced portions of the fixed section of the standard of the jack is a flanged plate 21 through which passes a pivot pin 22. A foot lever comprising a foot rest 23 and arms 24, has its said arms pivotally connected to the pin 22 at the ends thereof. The extremities of the arms 24 project beyond the pivot 22 and to them are connected the upper ends of links 25. A pivot pin 26 is engaged, interchangeably, through the corresponding openings of the standard section 17 and interchangeably through openings 27 formed in the links 25, cotter pins 28 being employed to hold the pin in this engagement. It will be readily understood from the foregoing that the pin 26 may be adjusted to elevate vehicle wheels the axles of which are located at various distances from the ground and that downward hand or foot pressure upon the lever 23 will serve to elevate the standard section 17 to lift the axle. It will also be understood that while the lever 23 must oscillate in a vertical direction, the head 18 may be turned to engage the wheel hub or axle in such manner that the device may be used even when the vehicle is located close to a wall or similar structure.

While the form of foot lever shown in the first five figures of the drawings is the preferred form, one such as shown in Fig. 6 may be employed. This form of foot lever comprises an arm 29 and an arm 30, the former shorter than the latter and the two secured together as at 31. The arm 30, at it end, is bent laterally as at 32 to afford a foot rest.

In the form of the invention shown in Figs. 7 and 8 of the drawings, the fixed member of the standard is of tubular form and is formed with oppositely located slots 33 in which works a pivot pin 34 corresponding to the pin 26 of the previously described form of the invention. In this form of the invention, a bearing 35 is secured upon the said fixed section of the standard at the upper end thereof to receive the pivot pin 22. In other respects this form of the invention is structurally the same as the preferred form previously described.

In the form of the invention shown in Fig. 9 of the drawings, the fixed member of the standard is tubular and is threaded, as at 35', into the base 36. A cap 37 is disposed upon the upper end of the said section and is held thereon by a pin 38 secured transversely through the cap and a transverse groove 39 formed in the side of the said section. The head of the jack, in this form of the invention, is formed with a seat 40 and a seat 41, the latter being located in a plane below the former. By providing two seats upon the movable member of the jack, it may be engaged with the front or the rear axle of a vehicle with equal facility without any change or adjustment.

It is preferable that the spaced portions of the standard 10 be formed with oppositely located openings 42 through corresponding ones of which, and below the lower end of the section 17, may be inserted a pin (not shown) for the purpose of holding the standard section 17 at a greater elevation than is possible with the adjustment heretofore described.

What is claimed is:

As an article of manufacture, a jack comprising a base, a fixed standard section mounted upon the base comprising a channel bar bent upon itself with its flanges presented toward each other, a slidable standard section fitted between the spaced portions of the fixed standard section, a clip embracing the upper ends of the spaced portions of the fixed section and having terminal portions projecting beyond one of the said spaced portions, a flanged plate secured to the said spaced portion of the fixed standard section and located between the projecting portions of the clip, a pivot pin held between the said plate and the said portion of the fixed standard section and projecting at its ends through the projecting portions of the clip, an operating lever pivoted to the projecting ends of the pivot pin, and links pivoted to the lever and to the movable standard section.

In testimony whereof, I affix my signature in presence of two witnesses.

GEORGE M. BEARD.

Witnesses:
 STEPHEN A. POWERS,
 BESS BURKHART.

Copies of this patent may be obtained for five cents each, by addressing the "Commissioner of Patents, Washington, D. C."